United States Patent [19]
Vincent

[11] 4,062,461
[45] Dec. 13, 1977

[54] HAY BALE LOADER

[76] Inventor: Herman C. Vincent, Jet, Okla. 73749

[21] Appl. No.: 746,571

[22] Filed: Dec. 1, 1976

[51] Int. Cl.² .............................................. B60P 3/00
[52] U.S. Cl. ............................ 214/85.5; 214/DIG. 4
[58] Field of Search ................... 214/85.5, 85.1, 86 A, 214/DIG. 4, 517

[56] References Cited

U.S. PATENT DOCUMENTS

| 2,073,563 | 3/1937 | Phillips | 214/85.5 |
| 2,547,601 | 4/1951 | Scheirer | 214/85.5 |
| 3,497,094 | 2/1970 | Conner et al. | 214/85.5 X |
| 3,759,407 | 9/1973 | Boster et al. | 214/86 A |
| 3,944,095 | 3/1976 | Brown | 214/85.5 X |

Primary Examiner—Albert J. Makay
Attorney, Agent, or Firm—Robert K. Rhea

[57] ABSTRACT

A pair of elongated chains of substantially equal length are connected at one end in spaced-apart relation to a bar extending transversely of the tailgate open rearward end portion of a pickup truck bed. The pickup truck is disposed with the rearward end of its bed adjacent and parallel with the longitudinal axis of a jumbo size hay bale to be loaded into the pickup bed. The elongated chains are manually entrained around a circumferential portion of the respective ends of the hay bale and their interconnected ends are entrained upwardly and over the hay bale opposite the pickup truck. A winch, mounted at one end of the forward end portion of the pickup truck bed, includes a winch line, entrained through a pulley secured to the forward end of the pickup truck bed medially its width, extended rearwardly and connected with the interconnected ends of the chains.

Operating the winch, in a winch line winding up action, results in a rolling action of the hay bale on the chains into the rearward end portion of the pickup truck bed for transporting the loaded hay bale to another location.

1 Claim, 4 Drawing Figures

HAY BALE LOADER

BACKGROUND OF THE INVENTION

1. Field of the invention

The present invention relates to farm equipment and more particularly to a hay bale loader.

Jumbo size bales of hay, or the like, are usually cylindrical in general configuration having a length on the order of 5 feet (1.52 meters) and 6 feet (1.83 meters) or more in diameter having a mass of approximately one-half ton (0.45 metric ton) or more and thus are not easily lifted and transported, as from the field to a place of storage or to livestock feeding grounds.

This invention provides winch operated flexible strand members for loading such bales of hay onto the bed of a pickup truck, or the like.

2. Description of the prior art.

Hay bale loaders for moving large size cylindrical bales of hay or fodder presently in use usually comprise a trailer-type device, such as is disclosed by patent No. 3,964,621 which uses a winch mounted on the forward end of a wheel supported trailer frame for tilting a bale of hay to a loaded position on the trailer frame by means of a spike inserted axially into the hay bale and connected with the winch to tilt and hold the hay bale on the trailer.

The principal objection to such a hay bale loader is that it represents an expense for equipment used only periodically, the expense being considerably greater than the cost of the hay bale loader of this invention. Further, the strands, such as twine, holding the hay or feed in its rolled up condition, on account of weathering, such as over a period of two or more years, usually have become weakened which results in their breaking and a resulting failure to load the bales of feed onto the trailer.

This invention provides a hay bale loading apparatus which comprises a minimum of relatively inexpensive parts occupying a relatively small space when not in use and which is easily and quickly assembled for loading a hay bale.

SUMMARY OF THE INVENTION

An elongated crossbar adapted to be transversely received and wedged against lateral rearward movement by the rearward end portion of a pickup truck bed having the tailgate in open position is connected with a pair of spaced-apart elongated flexible members, such as chains. The chains are entrained intermediate their length around a circumferential portion of the respective ends of a jumbo size hay bale when the rearward end of the pickup bed is disposed adjacent and parallel with the axis of the hay bale to be loaded. The ends of the chains opposite the pickup are connected together and with the payed out end of a winch line mounted on a winch reel supported by the forward end of the pickup truck bed. Winding up the winch line on the winch reel rolls the hay bale on the chains and lifts the hay bale into the rearward end portion of the pickup truck bed.

The principal object of this invention is to provide a one man operated apparatus for loading jumbo size bales of hay, or the like, into a pickup truck bed for transport to another location.

BRIEF DESCRIPTION OF THE INVENTION

DESCRIPTION OF THE PREFERRED EMBODIMENTS

Figure 1:
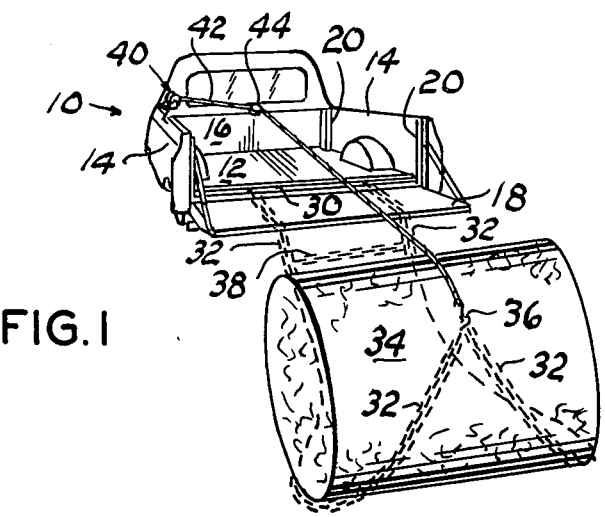
FIG. 1 is a perspective view illustrating the initial position of a pickup truck when provided with the hay bale loading apparatus for loading the hay bale.

Like characters of reference designate like parts in those figures of the drawings in which they occur.

In the drawings:

The reference numeral 10 indicates a pickup truck having a bed defined by a floor 12, side walls 14, a forward end 16 and a tailgate 18. The truck bed side walls are provided at their forward and rearward ends with opposing vertical tubular standards 20 for receiving the posts of side wall or panel extensions, not shown. The above description is conventional with pickup trucks with which the invention is to be used.

The invention comprises an elongated tube or bar 30 having a length substantially equal to the transverse dimension of the pickup truck bed between its confronting side wall surfaces. The bar 30 is disposed transversely of the rearward end portion of the pickup bed in contact with the floor 12 and forwardly of the rearward standards 20. A pair of elongated flexible members, such as chains 32, are secured at one end in spaced-apart relation longitudinally of the bar 30. The spacing between the bar connected ends of the chains is less than the length of a hay bale 34 to be loaded, for example, approximately one-half its length. The other ends of the chains are provided with conventional hooks and connected together, as at 36. The length of the chains 32 is preferably at least as great as the circumference of the hay bale 34 for the reasons presently apparent.

Spaced rearwardly of the rearward end portion of the pickup truck bed, the chains are interconnected by a flexible member, such as a chain 38, to prevent a spreading apart action of the chains during the hay bale loading action.

A conventional winch 40, which may be manually or power operated, is mounted in one of the forward standards 20 at the forward end 16 of the truck bed. The winch 40 includes a winch line or cable 42 which is entrained through a pulley block 44, such as a snatch block, secured to the forward end wall 16 of the truck bed medially its width.

Figure 4:
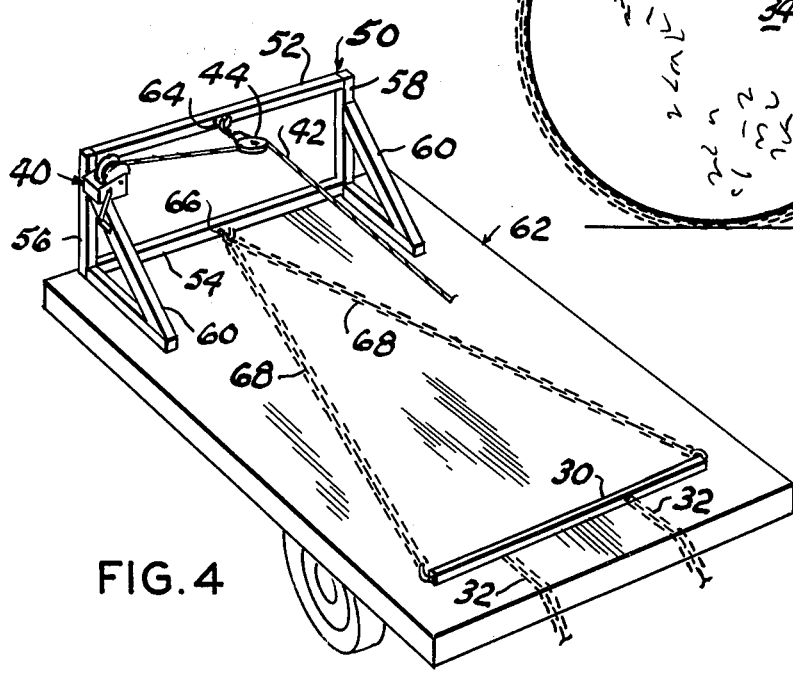

FIG. 4 illustrates a hay bale loading apparatus when used with a flat bed truck, or the like. A rectangular frame 50, formed from angle iron or tubular material, comprising upper and lower horizontal members 52 and 54, are joined in vertical spaced relation by frame uprights 56 and 58. Rearwardly extending angular brace members 60, connected with the respective ends of the rack, connect the rack transversely to the forward end of the truck bed 62 by bolts, not shown. Medially their ends, the upper and lower frame members are provided with hooks 64 and 66, respectively. A pair of flexible members, such as cables or chains 68, are connected at one end with the lower hook 66 and connected at their other ends with respective ends of the cross-bar 40 extending transversely of the rearward end portion of the truck bed 62. The flexible members 32 are similarly connected with the crossbar 30. The winch 40 is secured to one of the frame uprights 56 or 58 and the pulley block 44, having the winch line 42 entrained therethrough, is connected with the upper hook 64 and the line 42 extended rearwardly for connection at its payed out end with the flexible members 32 when entrained over the bale 34.

Figure 3:
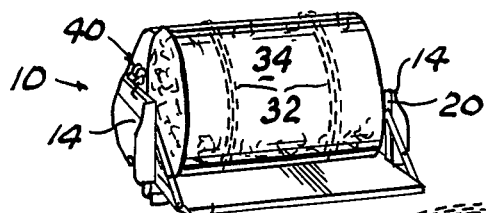
FIG. 3 is a fragmentary side elevational view, to a larger scale, of the rearward end portion of a pickup truck having a hay bale loaded thereon; and, FIG. 4 is a fragmentary perspective view, to a different scale, illustrating an alternative embodiment of the hay bale loader.
Figure 2:
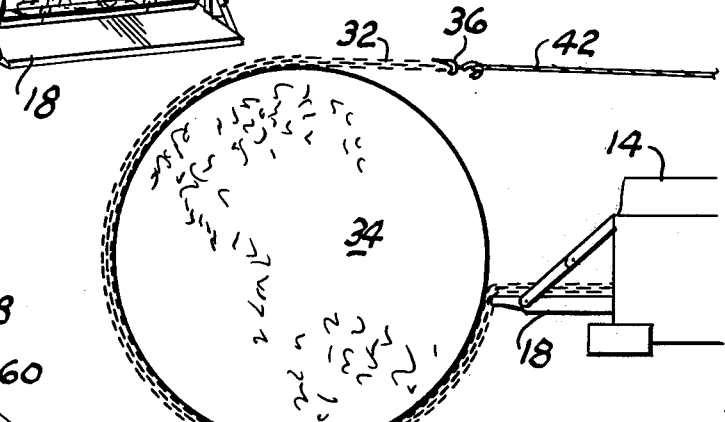
FIG. 2 is a fragmentary side elevational view of a hay bale adjacent the rearward end of a pickup truck bed when being lifted in a rolling action into the truck bed.

In operation of the embodiment of FIG. 1, the pickup truck having the end gate 18 in open position, is disposed with the rearward end of the truck bed adjacent and parallel with the longitudinal axis of the hay bale 34. Intermediate their ends, the chains 32 are individually entrained adjacent the surface of the earth around the respective ends of the hay bale 34, as shown in FIG. 1, with their connected ends entrained upwardly and partially over the hay bale medially its length. The payed out winch line 42 is then connected ends with the connected ends of the chains and the winch operated to wind up the line 42 and roll the hay bale 34 to an overlying position with respect to the chains 32 and toward and upwardly into the pickup truck bed, as shown in FIG. 3.

The operation of the embodiment shown by FIG. 4 is substantially identical to that shown hereinabove for FIG. 1.

The bale may be unloaded or rolled off the truck bed 62 by disconnecting the flexible members 68 from the hook 66 and partially entrained them over the forwardly disposed surface of the hay bale 34 so that a rearward pull on the members 68 rolls the hay bale 34 off the rearward end of the truck. Similarly, the chains 68 may be connected with the crossbar 30, when used with the pickup truck 10, for moving the hay bale out of the pickup truck.

Obviously the invention is susceptible to changes or alterations without defeating its practicability. Therefore, I do not wish to be confined to the preferred embodiment shown in the drawings and described herein.

I claim:

1. Loading apparatus in combination with a pickup truck for large size, generally cylindrical, bales of hay, or the like, said pickup truck having a load supporting bed defined by generally vertical side walls terminating rearwardly to define a rearward open end and having a side wall standard vertically secured to the inner surface of the rearward end portion of each side wall, the improvement comprising:

an elongated bar extending transversely across the rearward end portion of said bed forwardly of said standards;

a pair of elongated flexible members secured at one end, in spaced-apart relation, to said bar, said members extending rearwardly of said pickup truck in parallel relation normal to the longitudinal axis of a cylindrical hay bale to be loaded and being entrained, intermediate their ends adjacent the surface of the earth, around opposing ends of a hay bale to be loaded with the terminal end portions of said flexible members contacting the circumferential portion of a hay bale to be loaded opposite said pickup truck;

a cross member extending transversely between said flexible members adjacent that side of a hay bale to be loaded facing said pickup truck; and, winch means supported by a forward end portion of said pickup truck, said winch means having a winch line connected, at its end opposite the winch when payed out, with the other ends of said flexible members and entrained over the hay bale to be loaded, whereby winding up said winch line generates a rolling action on a hay bale to be loaded for disposing it on said flexible members and a subsequent lifting action onto said pickup truck bed.

* * * * *